United States Patent [19]

Cudmore

[11] 4,033,296

[45] July 5, 1977

[54] AERODYNAMIC HANGING BIRDHOUSE

[76] Inventor: Patrick J. Cudmore, 28 Linden Lane, Duxbury, Mass. 02332

[22] Filed: Oct. 28, 1975

[21] Appl. No.: 626,281

[52] U.S. Cl. ............................................. 119/23
[51] Int. Cl.² ........................................ A01K 31/00
[58] Field of Search ........................... 119/23, 51 R

[56] References Cited

UNITED STATES PATENTS

| 1,166,100 | 12/1915 | White | 119/23 |
| 2,260,018 | 10/1941 | Garthus | 119/23 |
| 2,887,987 | 5/1959 | Fitzgerald et al. | 119/23 |
| 3,182,635 | 5/1965 | Waite | 119/51 R |

Primary Examiner—Hugh R. Chamblee
Attorney, Agent, or Firm—Thompson, Birch, Gauthier & Samuels

[57] ABSTRACT

A hanging birdhouse having an aerodynamic asymmetrical teardrop shape. The birdhouse is turned by the wind so that the entry hole always faces the downwind direction. Ventilation slots are provided adjacent to the entry hole so that the wind produces forced ventilation of the birdhouse.

15 Claims, 5 Drawing Figures

U.S. Patent  July 5, 1977  4,033,296
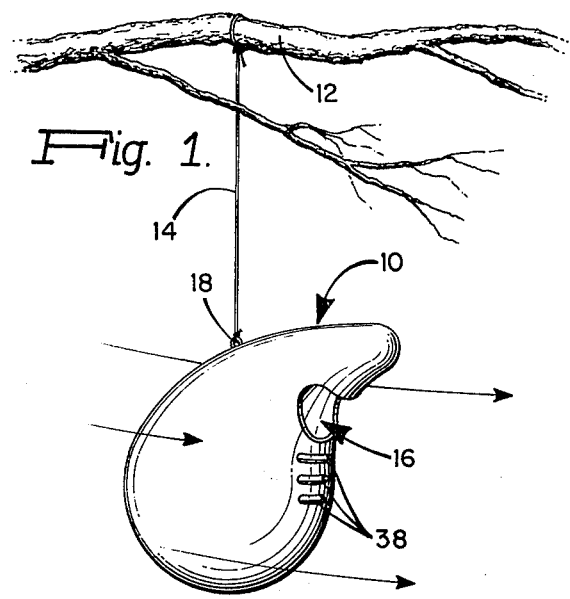
Fig. 1.
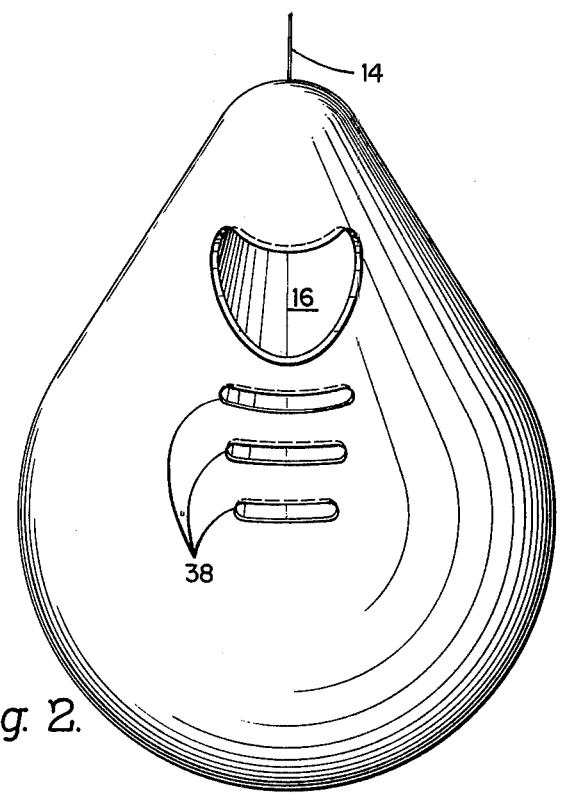
Fig. 2.
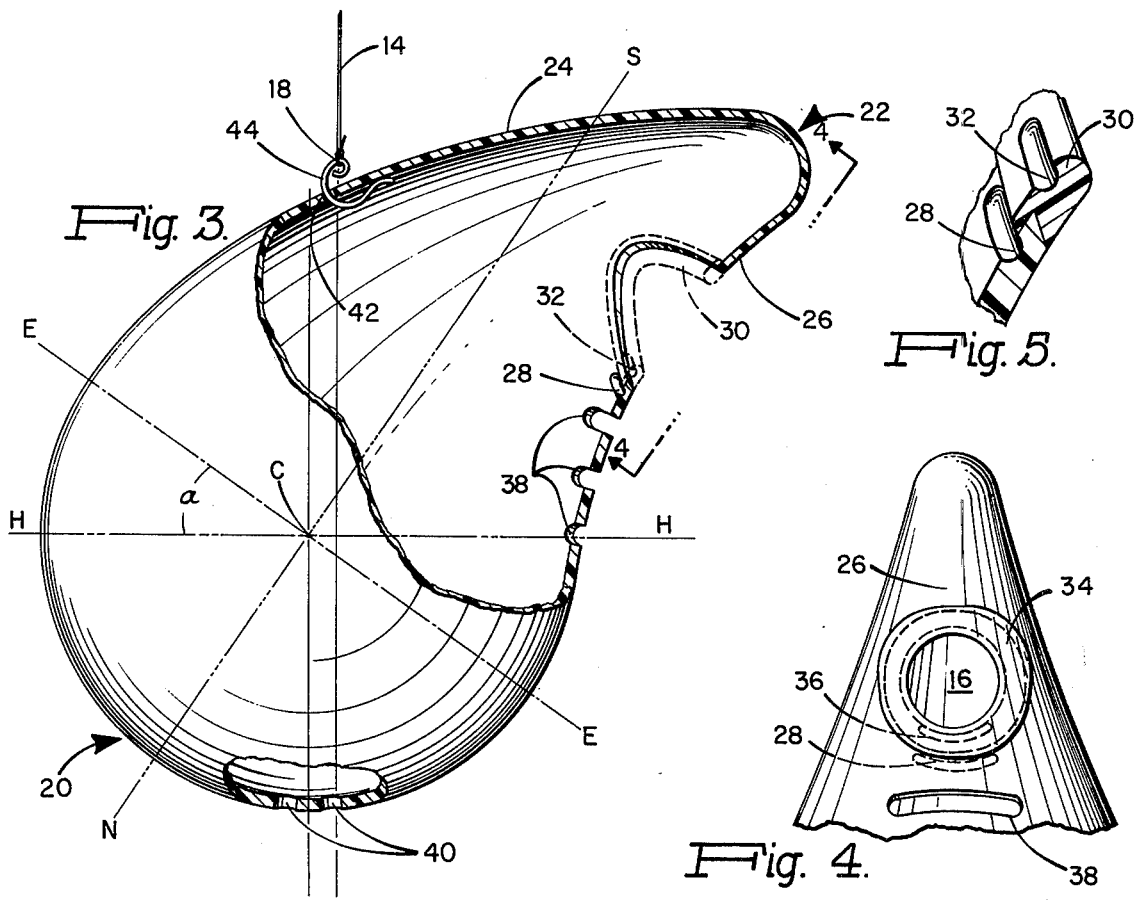
Fig. 3.
Fig. 4.
Fig. 5.

AERODYNAMIC HANGING BIRDHOUSE

BACKGROUND OF THE INVENTION

Conventional birdhouses are typically fixed in position on posts, trees or houses. These fixed birdhouses are therefore easily accessible to natural predators such as cats. They are also subject to the harsh effects of wind, rain and snow which blow directly into the entry hole much of the time.

Conventional birdhouses are usually poorly ventilated and have little or no provision for drainage. They have an entry hole of a fixed size and therefore attract a limited number of bird species. They usually have a perch which can be utilized as a footing by predators or by troublesome birds to harass or dislodge the occupants.

Conventional birdhouses have an entry hole which is positioned a considerable distance above the bottom of the birdhouse in order to protect the young birds (fledglings) from large predators. However, fledglings have considerable difficulty climbing the inner wall up to the entry hole to make their early learning flights. The inner wall usually is smooth and is difficult to climb. Accordingly, it is a known fact that many weaker fledglings often die prematurely because they are unable to leave the birdhouse.

SUMMARY OF THE INVENTION

The birdhouse of this invention is a considerable and unique improvement over the previously described conventional birdhouses. Applicant's birdhouse ia designed to be hung by a flexible line from an overhead support, such as a tree limb. This protects the birdhouse from predators. The birdhouse has an aerodynamic asymmetrical teardrop shape which causes it to turn in the wind so that the entry hole always faces downwind. This prevents wind, snow and rain from blowing into the entry hole.

Applicant's birdhouse is continuously ventilated by several specially shaped and positioned slots which admit a flow of air that circulates and then flows out of the entry hole. Drain holes are also provided for drainage. No perch is needed or provided.

The birdhouse is designed to tip or pitch upwardly as the fledglings attempt to climb the inner wall. This allows the fledglings to climb an inner wall which is angled rather than one which is vertical. The ventilation slots also act as an interior ladder to further ease the climbing process.

Applicant's birdhouse is constructed as a strong and lightweight monocoque structure. It is very attractive visually and lends itself to modern plastic molding techniques. It utilizes a detachable entry hole flange to permit the owner to select the types of birds that he wants as occupants. As the birds enter and leave the birdhouse, it tips or nods slowly. This feature signals the viewer that there is activity at the birdhouse.

The aerodynamic shape of the birdhouse is an important feature for many reasons. It enhances weather protection, ventilation, entry hole orientation, occupant comfort and occupant safety.

The birdhouse of this invention solves most of the problems presented by conventional birdhouse structures. The various features of applicant's birdhouse will be clearly understood by reference to the attached drawings and the following detailed description of the preferred embodiment.

DESCRIPTION OF THE DRAWINGS

FIG. 1 is a perspective view of the birdhouse of this invention, the entry hole being aerodynamically turned in the downwind direction.

FIG. 2 is an elevation of the birdhouse looking in the upwind direction and showing the entry hole and the ventilation slots.

FIG. 3 is a side elevation, partly in section, of the birdhouse shown in FIG. 2.

FIG. 4 is an elevation of a portion of the birdhouse shown in FIG. 3, taken along line 4—4 of FIG. 3.

FIG. 5 is a magnified cross-section of a portion of the lower lip of the entry hole, and the inner grooves of the birdhouse shown in FIG. 3.

DESCRIPTION OF THE PREFERRED EMBODIMENT

The birdhouse 10 shown in FIG. 1 is adapted to be hung from an overhead support, such as a tree limb 12, by a flexible line 14. The birdhouse yaws or rotates about the vertical axis of line 14 in response to the wind direction so that the entry hole 16 is always pointed in the downwind direction (i.e. away from the wind). The birdhouse also pitches about a horizontal axis which is perpendicular to both the wind direction and the vertical line 14, and which passes through line attachment point 18. The pitching is caused by the force of the wind and by the weight and action of the birds as they enter, leave, and occupy the birdhouse.

The birdhouse 10 is preferably formed as a monocoque structure with maximum interior volume and minimum exterior surface area, thereby minimizing the amount of plastic material required. The birdhouse can be manufactured by injection molding or rotational molding techniques and preferably has a wall thickness of approximately 2.5 mm. throughout. Although other materials could be used, plastic is preferred.

The shape of the birdhouse 10 is somewhat difficult to accurately describe in words, but it approximates an asymmetrical teardrop or ovoid. With respect to FIG. 3, the hollow birdhouse structure has a substantially hemispherical leading portion 20 which extends forwardly from the imaginary equator E-E. To assist in describing the shape of the hollow structure, an imaginary North-South axis N-S has been drawn on FIG. 3, as well as an imaginary horizon H-H, all drawn through the center C of leading portion 20.

The trailing portion 22 is substantially pointed relative to the rounded leading portion 20 and droops downwardly relative to North-South axis N-S. The trailing portion has a convex upper side 24 and a mostly concave lower side 26, when viewed in cross-section (as shown in FIG. 3).

An entry hole 16 is formed in lower side 26 and is substantially circular when viewed head-on (see FIG. 4). The size of the entry hole is important because it determines the largest size of songbird which will be able to use the birdhouse. Preferably, the entry hole has a 4 cm. diameter which is suitable for use by bluebirds, Carolina wrens, house finches, house sparrows, tree swallows, and other birds of similar size. The lower lip of the entry hole is provided with an inner groove 28 which serves as a gripping recess for a bird's claws as the bird enters or leaves the birdhouse. The entry hole 16 is protected from falling rain or snow because it is on the lower side 26 of the trailing portion 22 and is protected by being under the upper side 24. The entry hole is protected from the wind because the aerodynamic shape of the birdhouse always causes the entry hole to be turned in the downwind direction, as will be explained subsequently.

The entry hole 16 can be made smaller by use of a pressin, resilient, annular flange 30 which seats on the lip of the entry hole 16, as shown in FIGS. 3 and 5. Flange 30 has an inner groove 32 (similar to groove 28) which serves as a gripping recess for a bird's claws. Preferaly, flange 30 has an inner diameter of approximately 3 cm. which makes the reduced size entry hole suitable for use by black-capped chickadees, common bushtits, downy woodpeckers, tufted titmice, white breasted nuthatches, and other birds of similar size.

The entry hole can be made still smaller by use of a larger press-in resilient flange 34, as shown in FIG. 4. Flange 34 is similar to flange 30 except that it has an inner diameter of approximately 2.5 cm. Flange 34 has a similar inner groove 36 and forms a reduced size entry hole which is suitable for use by Bewick wrens, house wrens, red-breasted nuthatches, violet green swallows, and other birds of similar size.

In order to ventilate the birdhouse, a plurality of ventilation slots 38 (preferably three) are formed in the lower side 26 of the trailing portion 22 between the entry hole 16 and the leading portion 20. The slots are parallel and spaced-apart and increase in length in the direction of the entry hole. Air enters slots 38 and leaves through the entry hole 16. In appearance, the slots resemble the rungs of a ladder.

To provide drainage, a plurality of drain holes 40 are formed in the leading hemispherical portion 20 of the birdhouse. Water or other fluids will drain out under the force of gravity.

A small hook hole 42 is formed in the trailing portion convex upper side 24. In hook hole 42, a small approximately C-shaped hanging hook 44 is removably inserted. Hook 44 is resilient and seats firmly in place. The exterior end of hook 44 is provided with a loop which forms line attachment point 18 to which flexible line 14 is attached.

The action of the birdhouse under the influences of weather and bird activity will now be discussed. The empty birdhouse is normally oriented as shown in FIG. 3 in the absence of wind. It will be seen that the angle $\alpha$ is approximately 35° between the equatorial plane E-E and the horizontal plane H-H. The line attachment point 18 should be relatively close to the vertical line running through center C, but this is not critical.

When nesting birds, such as fledglings, occupy the birdhouse the house will "pitch down" and angle $\alpha$ will decrease. This will cause the entry hole 16 to become more vertical and to be easier to enter by the parent bird who is bringing food to the fledglings.

As the wind increases, the house will "pitch up" and angle $\alpha$ will increase. This will cause the entry hole to become more horizontal and to be better protected from any falling precipitation. Pitching up also presents the wind with a better aerodynamic shape thereby reducing drag and minimizing the swinging of the birdhouse despite the increased wind velocity.

The aerodynamic air foil of the birdhouse also cause it to rotate or yaw about line 14 so that entry hole 16 always faces downwind and is protected from the wind.

The ventilation slots 38 serve two functions. They act as an interior and exterior ladder for the fledglings to climb upon as they learn to move around and fly. The air foil effect of the wind on the birdhouse causes lower air pressure to be produced near the entry hole 16 than near the ventilation slots 38. Thus, by a venturi effect, air is continuously drawn into the ventilation slots and out of the entry hole. This produces positive ventilation in the birdhouse even in light wind conditions.

The ventilation slots shed rain water and prevent its entry. This is because as the descending water runs down the lower side exterior surface, it meets the acute slot angle and falls off the house rather than entering into the slots. Also, each slot overhangs and is wider than the next lower slot and therefore almost all the water is shed by the highest and widest slot before it gets to the lower slots.

The owner of the birdhouse can select to a certain extent which bird species will be attracted to his birdhouse. This selection is accomplished by hanging the birdhouse from a tree limb at a specified height above the ground and by creating the desired entry hole size, perhaps utilizing one of the resilient flanges. The C-shaped hook is easy to insert or remove from the small hook hole (which admits virtually no rain) and the birdhouse can be conveniently cleaned periodically with a hose and soap because rinse water will drain out through the various openings, including the drain holes.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:
1. A birdhouse adapted to be hung from an overhead support comprising:
   a. a hollow structure having an asymmetrical teardrop shape including a substantially hemispherical leading portin, and a downwardly drooping, substantially pointed trailing portion having a convex upper side and a substantially concave lower side, when viewed in cross-section;
   b. an entry hole formed in said trailing portion lower side;
   c. at least one ventilation aperture formed in said trailing portion lower side and located between said entry hole and said leading portion; and
   d. means for hanging said birdhouse from an overhead support, said hanging means including a flexible line attachment point located on said trailing portion upper side;
   e. the aerodynamic teardrop shape of said hanging hollow structure causing said entry hole to rotate horizontally to the downwind direction in the presence of wind.
2. The birdhouse of claim 1 wherein the equatorial plane of said hollow structure leading portion, when unoccupied, forms an angle of approximately 35° with the horizon in the absense of wind.
3. The birdhouse of claim 1 wherein the equatorial plane of said hollow structure leading portion, when unoccupied, forms an angle which is larger than 30° with the horizon in the presence of wind.
4. The birdhouse of claim 1 wherein the equatorial plane of said hollow structure leading portin, when occupied, forms an angle which is smaller than 45° with the horizon in the absence of wind.
5. The birdhouse of claim 1 further having means for reducing the diameter of said entry hole.

6. The birdhouse of claim 5 wherein said reducing means includes a resilient annular flange detachably attached to said entry hole.

7. The birdhouse of claim 6 wherein said resilient annular flange and said entry hole both have internal circular grooves shaped to accommodate the claws of a bird.

8. The birdhouse of claim 1 wherein said hanging means includes a hook hole formed in said trailing portion upper side, and a hook mounted in said hook hole, and a flexible line affixed to said hook.

9. The birdhouse of claim 1 wherein said entry hole is spaced-apart horizontally from an imaginary vertical line drawn through said flexible line attachment point, said hanging birdhouse being rocked by the entry and exit of birds through said entry hole.

10. The birdhouse of claim 1 wherein said at least one ventilation aperture comprises a plurality of substantially parallel slots having a ladder rung-like, spaced-apart orientation.

11. The birdhouse of claim 10 wherein said entry hole and said ventilation slots are disposed beneath said convex upper side of said hollow structure.

12. The birdhouse of claim 1 wherein said hemispherical leading portion of said hollow structure is provided with one or more liquid drain holes.

13. The birdhouse of claim 1 wherein said hollow structure is a monocoque structure.

14. A birdhouse adapted to be hung from an overhead support comprising:
   a. a hollow structure having an asymmetrical teardrop shape including a substantially hemispherical leading portion, and a downwardly drooping, substantially pointed trailing portion having a convex upper side and a substantially concave lower side, when viewed in cross-section;
   b. an entry hole formed in said trailing portion lower side;
   c. a plurality of substantially parallel ventilation slots formed in said trailing portion lower side, said ventilation slots having a ladder rung-like, spaced-apart orientation extending between said entry hole and said leading portion;
   d. means for hanging said birdhouse from an overhead support, said hanging means including a flexible line attachment point located on said trailing portion upper side, and a flexible line affixed to said attachment point; and
   e. said asymmetrical teardrop shaped hollow structure being caused by ambient wind conditions to aerodynamically yaw and pitch to maintain said entry hole in the downwind direction and to minimize swinging.

15. The birdhouse of claim 8 wherein said hook has a substantially C-shape.

* * * * *